(12) United States Patent
Stoodley et al.

(10) Patent No.: US 6,182,282 B1
(45) Date of Patent: Jan. 30, 2001

(54) METHOD AND SYSTEM FOR CONSTRUCTING HYBRID VIRTUAL FUNCTION TABLES

(75) Inventors: Kevin Alexander Stoodley, Richmond Hill; Brian Ward Thomson, North York, both of (CA)

(73) Assignee: International Business Machines Corporation, Armonk, NY (US)

(*) Notice: Under 35 U.S.C. 154(b), the term of this patent shall be extended for 0 days.

(21) Appl. No.: 09/140,830

(22) Filed: Aug. 26, 1998

(30) Foreign Application Priority Data

Apr. 28, 1998 (CA) .................................................. 2236064

(51) Int. Cl.⁷ ...................................................... G06F 9/45
(52) U.S. Cl. ................................................................ 717/5
(58) Field of Search .................................... 717/5, 8, 9, 1; 395/705

(56) References Cited

U.S. PATENT DOCUMENTS

| | | | |
|---|---|---|---|
| 5,297,284 | * | 3/1994 | Jones et al. ................................ 717/5 |
| 5,327,562 | * | 7/1994 | Adcock .................................... 717/8 |
| 5,371,891 | * | 12/1994 | Gray et al. ................................ 717/5 |
| 5,410,705 | * | 4/1995 | Jones et al. ................................ 717/5 |
| 5,432,936 | * | 7/1995 | Gray et al. ................................ 717/5 |
| 5,442,793 | * | 8/1995 | Christian et al. ..................... 709/303 |
| 5,535,391 | * | 7/1996 | Hejlsberg et al. ........................ 717/9 |
| 5,617,569 | * | 4/1997 | Gray et al. ............................. 707/103 |
| 5,754,862 | * | 5/1998 | Jones et al. ................................ 717/5 |
| 5,794,041 | * | 8/1998 | Law et al. ................................. 717/1 |
| 5,854,931 | * | 12/1998 | Jones et al. ................................ 717/5 |

OTHER PUBLICATIONS

Title: Recording Virtual Function Table Offset in External Variables, IBM Technical Disclosure Bulletin, Jan. 1991.*
Title: C++ Compiler Implementation for Virtual Functions with Varying Return Types, IBM Technical Disclosure Bulletin, Jun., 1995.*

* cited by examiner

*Primary Examiner*—Tariq R. Hafiz
*Assistant Examiner*—Chameli C. Das
(74) *Attorney, Agent, or Firm*—Roy W. Truelson; Owen J. Gamon

(57) ABSTRACT

A system and method for accessing virtual functions from classes compiled with compilers using different virtual function table layouts and/or different function member call protocols. A hybrid virtual function table, incorporating entries created by both legacy and adjustor thunk methods, is disclosed. The hybrid virtual function table permits backwards compatibility with previously compiled classes, while taking advantage of the faster adjustor thunk implementation for new code.

28 Claims, 9 Drawing Sheets

METHOD AND SYSTEM FOR CONSTRUCTING HYBRID VIRTUAL FUNCTION TABLES

FIELD OF THE INVENTION

This invention relates to compilers used in computer programming languages. In particular, this invention relates to a method and system for constructing virtual functions within a hierarchy of classes where the classes can be compiled using different virtual function table structures.

BACKGROUND OF THE INVENTION

Object-oriented programming languages, such as C++ and Java, share several common properties. Generally, they support "encapsulation", or the binding of functions and data structures. Encapsulation allows the creation of classes which combine data members and member functions. For example, a user can define a class Circle:

```
class Circle {
    int x;
    int y;
    int radius;
    void DrawCircle ( );
};
```

The data members of the class Circle are x, y, and radius. The member function of the class is DrawCircle ( ).

"Inheritance" is the second property shared by object-oriented programming languages. Inheritance allows a user to define a derived class which inherits the data and function members of one or more previously defined classes. For example, a class ShadedCircle can be defined to inherit from previously defined class Circle:

```
class ShadedCircle : Circle {
    int Colour;
    void ShadeCircle ( );
};
```

Class ShadedCircle inherits the data and function members from Circle and introduces new data member Colour, and new function member ShadeCircle. A hierarchy of classes can be developed, each deriving data and function members from previously defined classes. If a class derives data and function members from more than one class in a hierarchy, it is an example of multiple inheritance.

The final property shared by true object-oriented programming languages is "polymorphism", or late binding. Polymorphism allows a function or operator to be shared up and down a class hierarchy, with each class in the hierarchy implementing the function or operator in a manner appropriate to itself. In C++, polymorphism is accomplished by declaring a function "virtual". A virtual function can be overridden by a function of the same name and type in a derived class. For example, the function DrawCircle is declared to be virtual in classes Circle and ShadedCircle:

```
class Circle {
    int x;
    int y;
    int radius;
    virtual void DrawCircle( );
};
class ShadedCircle : Circle {
    int Colour;
    virtual void DrawCircle( );
};
```

If objects a and b are defined to be objects of type class Circle and type class ShadedCircle, respectively:
    Circle a;
    ShadedCircle b; then the statement:
    a.DrawCircle ( ) refers to the function DrawCircle as defined in class Circle; and
    b.DrawCircle ( ) refers to the function DrawCircle as defined in class ShadedCircle.

Encapsulation, inheritance and polymorphism allow the development of modular, maintainable and portable code. Ideally, classes and functions developed for one application can be re-used in subsequent applications.

A virtual function table ("VFT") is a compiler-created data structure used to support virtual function dispatch in object-oriented application programs. The VFT provides a technique to implement the two aspects of calling a virtual function at run time: which function to call, and how to adjust the value of a "this" pointer, as described below. Under an implementation commonly employed in early C++ compilers, each class having access to a virtual function member has an associated VFT which lists the addresses of each virtual function, in order of declaration, and an adjustment to the this pointer. Each object in a class contains a pointer to the VFT. The pointer to the VFT is initialized with the address of the associated virtual function table when the object is instantiated. To invoke a virtual function, the compiler generates code which accesses the virtual function member through the VFT.

Generally, a derived class inherits a copy of the VFT(s) associated with its base classes. A derived class that introduces a virtual function member has its own VFT which can include the entries from inherited VFT's from its base classes and entries for any newly introduced virtual functions.

For example, if derived class ShadedCircle introduces a new virtual function StretchCircle( ):

```
class ShadedCircle : Circle {
    int Color;
    virtual void DrawCircle( );
    virtual void StretchCircle( );
};
``` the associated VFT for class Circle would be:

| &Circle :: DrawCircle( ) | 0 | where &Circle :: DrawCircle( ) is the address of virtual function DrawCircle( ) for class Circle and the adjustment to the this pointer is zero. Class ShadedCircle would inherit the VFT for DrawCircle( ) from class Circle, and would construct a VFT for virtual function StretchCircle( ), resulting in two VFT's, the first containing the address to virtual function DrawCircle( ) and a zero adjustment to the this pointer, the second containing the address of virtual function StretchCircle( ) and an adjustment to the this pointer, again zero in this example:

| &ShadedCircle :: DrawCircle( )   | 0 |
| &ShadedCircle :: StretchCircle( ) | 0 |

In C++, the this pointer points to the object for which a function is called. Generally, the this pointer is passed to the function as a hidden argument. The this pointer in the case of a call can assume two values. When called, the this pointer is set to point within the object to the base class where it was introduced. The this pointer is the address of the occurrence of the introducing class in the object associated with the call. When a function is overridden, the overriding function must adjust the this pointer by the offset between the address of the object and the address of the occurrence of the introducing class within the object. The adjustment, commonly known as a "this adjustment", permits the overriding function to access the entire object of the class in which it was declared.

As discussed above, for reasons of backward compatibility, for example CFRONT™ compatibility, many compilers employ VFT's which contain a virtual function address and a this pointer adjustment for each virtual function inherited or introduced by a class. Calling a virtual function through a VFT constructed in such a manner has two significant drawbacks. First, adjustment of the this pointer occurs for every call, even when the required adjustment is zero. Secondly, even when the adjustment is zero, the space for an adjustment is reserved in the table, making the tables potentially quite large. Examination of typical C++ programs shows that the majority of adjustments are, in fact, zero, such as in cases of single inheritance and for classes on the left leg of a multiple inheritance hierarchy, as discussed below in greater detail. As a result, the code for calling a virtual function is larger and slower than may otherwise be necessary.

A more efficient VFT structure and method was subsequently, developed, employing an adjustor routine, commonly known as a "thunk". The term "thunk" is a common term in the art to denote the activities that take place in moving from one environment to another in a mixed environment program in the case described here, each VFT entry contains one pointer, if there is a non-zero adjustment required, then the pointer is the address of a thunk that adjusts the this pointer and then jumps to the function to be called. The advantages of the adjustor thunk implementation for calling virtual functions are that the cost of the this adjustment, in terms of both time and memory requirements, is only paid when a non-zero adjustment is required, and each entry for a virtual function in its associated VFT's contains only one member, either the address of the function or the address of a thunk for a function having a non-zero this pointer adjustment. This results in shorter, faster code and VFT's which are half the size as in the first method described above.

However, there are still problems associated with the prior art VFT structures and virtual function call methods. For example, the VFT's for virtual functions compiled by compilers using the first method are not compatible with the VFT's for virtual functions compiled by compilers implementing the adjustor thunk method. In order to use the more efficient adjustor thunk implementation, all code, including the libraries, etc., compiled by a compiler using the first method would have to be recompiled and retested, a costly, time consuming and undesirable solution for both software developers and users.

As a result, existing compiler developers must choose between developing compilers which break backwards compatibility and compilers which produce uncompetitively slow and/or large code when compared to compilers using the adjustor thunk implementation. Alternatively, compilers could support a command line option to generate VFT's employing either the first or adjustor thunk method. However, to support both VFT layouts, the compiler would have to be bundled with, and choose between, two complete sets of class libraries, one for each layout. Moreover, cross-inheritance and third party libraries cannot be supported. In addition, if one base class in the hierarchy cannot be recompiled because, for example, it is from a binary class library or framework, then all the classes in the hierarchy must use the layout of that base class. If there were two base classes with differing layouts then multiple inheritance of both these classes can not be supported.

SUMMARY OF THE INVENTION

It is an object of the present invention to provide a novel system, method and manufacture for constructing machine executable instructions from a higher level object-oriented language which obviates or mitigates the disadvantages of the prior art.

In a first embodiment the present invention provides a computer implemented method of compiling at least a portion of a computer program for calling at least one inherited virtual function in at least one class, the method comprising the steps of:

(i) determining the inherited virtual functions in said at least one class for which an address adjustment value would be stored in a virtual function table;

(ii) constructing said virtual function table for said at least one class, said virtual function table comprising an entry for each inherited virtual function, and for any new virtual function introduced in said at least one class, wherein each entry for each said determined inherited virtual function includes an address adjustment value, and wherein each entry for each remaining inherited virtual function and for each new virtual function comprises an address pointer representing one of the location of an address adjustment program and an address of said function.

In a further aspect, the present invention provides a computer implemented method for compiling a call to a virtual function in at least one class, the method comprising the steps of:

(i) determining inherited virtual functions in said at least one class for which an address adjustment value would be stored in a virtual function table;

(ii) determining a location of an entry for said virtual function in a virtual function table, said virtual function table comprising an entry for each inherited virtual function and for any new virtual function introduced in said at least one class, wherein each entry for each said determined inherited virtual function includes an address pointer to said inherited virtual function and an address adjustment value, and wherein each entry for each remaining inherited virtual function and for each new function comprises an address pointer representing one of the location of an address adjustment program and an address of said function;

(iii) employing said entry to operably construct a call to said virtual function.

In another aspect, the present invention provides a computer implemented method for accessing a virtual function in at least one class of a program, wherein said virtual function has associated therewith an entry in a virtual function table constructed for said at least one class, said virtual function table comprising an entry for each inherited virtual function and for any new virtual function introduced in said at least one class, wherein each said entry for an inherited virtual function for which an address adjustment is required includes an address pointer to said inherited virtual function and an address adjustment value, and wherein each entry for each remaining inherited virtual function and for each new function comprises an address pointer representing one of the location of an address adjustment program and an address of said function, the method comprising the steps of:

(i) accessing the virtual function table for said virtual function;

(ii) performing an address adjustment when an entry for the virtual function table contains an address adjustment value; and (iii) transferring execution of the program to the address indicated by the address pointer contained in said entry.

In a further embodiment, the present invention provides an article of manufacture comprising a computer-usable medium having computer-readable code means embodied therein for implementing a compiler for a set of object-oriented computer instructions, including means to produce at least a portion of a computer program for calling at least one inherited virtual function in at least one class, comprising:

computer-readable program code means for determining the inherited virtual functions from said at least one class for which an address adjustment value would be stored in a virtual function table; and computer readable program code means for constructing said virtual function table for said at least one class, said virtual function table comprising an entry for each inherited virtual function and for any new virtual function introduced in said at least one class, wherein each entry for each said determined inherited virtual function includes an address adjustment value, and wherein each entry for each remaining inherited virtual function and for each new virtual function comprises an address pointer representing one of the location of an address adjustment program and an address of said function.

In another aspect, the present invention provides a computer program product for use in a computer system having an operating system for implementing a compiler for a set of object-oriented computer instructions, including means to produce at least a portion of said computer program product for calling at least one inherited virtual function in at least one class, comprising:

a computer usable medium having computer readable program code means embodied in said medium for determining the inherited virtual functions from said at least one class for which an address adjustment value would be stored in a virtual function table; and a computer usable medium having computer readable program code means embodied in said medium for constructing said virtual function table for said at least one class, said virtual function table comprising an entry for each inherited virtual function and for any new virtual function introduced in said at least one class, wherein each entry for each said determined inherited virtual function includes an address adjustment value, and wherein each entry for each remaining inherited virtual function and for each new virtual function comprises an address pointer representing one of the location of an address adjustment program and an address of said function.

In a further aspect, the present invention provides a computer system having means for producing at least a portion of an object-oriented computer program comprising at least one class, said at least one class comprising at least one inherited virtual function in at least one class, comprising:

a general purpose computer for executing said object-oriented program;

means for determining the inherited virtual functions from said at least one class for which an address adjustment value would be stored therefor in a virtual function table;

means for constructing said virtual function table for said at least one class, said virtual function table comprising an entry for each inherited virtual function and for any new virtual function introduced in said at least one class, wherein each entry for each said determined inherited virtual function includes an address adjustment value, and wherein each entry for each remaining inherited virtual function and for each new function comprises an address pointer representing one of the location of an address adjustment program and an address of said function.

BRIEF DESCRIPTION OF THE DRAWINGS

Preferred embodiments of the present invention will now be described, by way of example only, with reference to the attached Figures, in which.

DETAILED DESCRIPTION

The present invention will be described in terms of the C++ programming language. It will be apparent to those skilled in the art that the method and system of the present invention is not so limited and can be applied to other object-oriented programming languages and compilers which employ virtual function table structures, or the like.

Figure 1:
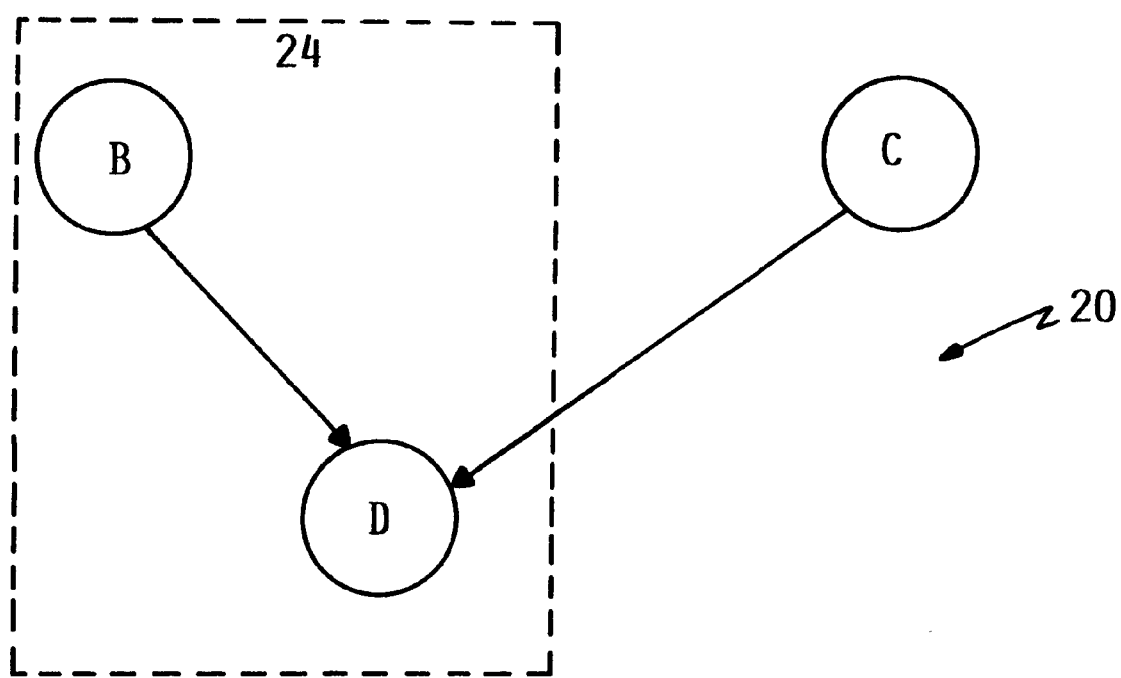
FIG. 1 shows an inheritance tree for the class hierarchy of Code Segment 1.

In the C++ programming language, an example of a typical class hierarchy might be coded as in the example shown in Code Segment 1. Classes B and C are base classes, where a base class is a class from which another class is derived. Class B introduces virtual function member X( )

and data member i, and class C introduces virtual function member Y( ) and data member j. As used herein, a function is "introduced" in a class if that function is not present in any of the base classes of that class. Derived class D inherits function members X( ) and Y( ) from class B and class C, respectively. Class D also introduces virtual function member Z( ) and data member k. The hierarchy of Code Segment 1 results in an inheritance tree 20 as shown in FIG. 1 where class B and class D form a left leg 24 of inheritance tree 20, the significance of which will be discussed in greater detail below.

A virtual function table (VFT) must be provided for each class in the hierarchy having functions which are declared to be virtual. Generally, each class containing a virtual function member has an associated VFT which provides means to access each virtual function in order of declaration, conventionally starting at the left leg 24 of the inheritance tree 20. The actual structure of the VFT depends on the compiler used to compile the c lass. Older compilers, such as that incorporated in International Business Machines Corporation's VisualAge® C++ for OS/2®v.3.0, use a VFT which provides a function pointer and a this pointer adjustment for every entry. As referred to herein, such a VFT will be termed "old", and "old" classes are referred to herein as those compiled using such an "old" method and/or compiler. Newer compilers, such as that found in IBM Corporation's VisualAge for C++ for Windows v.3.5, use a more efficient VFT structure employing the adjustor thunk method. These VFT's have a function pointer for each virtual function and adjustment of the this pointer occurs at the call site, if necessary. If a non-zero adjustment is required, then the pointer points to the address of a thunk that adjusts the this pointer and then jumps to the function to be called. As used herein, "new" classes are those compiled using such a "new" compiler.

For clarity of understanding of the present invention, the two prior art VFT implementations will first be described below, followed by a detailed, comparative discussion of the present invention.

Figure 2:
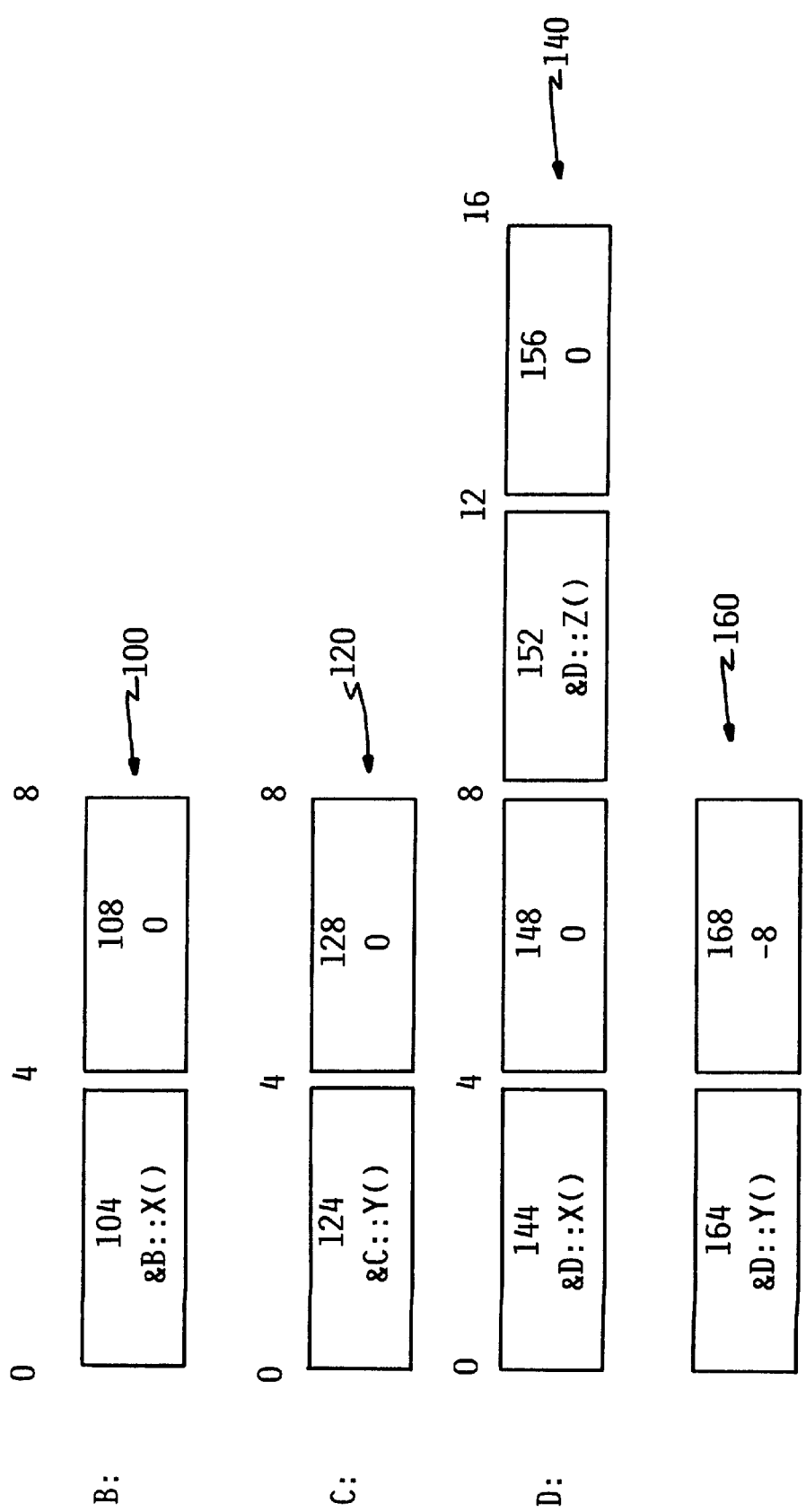
FIG. 2 shows a set of VFT's constructed in accordance with the prior art.

Assuming the classes shown in Code Segment 1 are all old classes, the associated VFT's for the classes can have a structure containing the entries shown in FIG. 2. A VFT 100 for class B has a first slot 104 and a second slot 108. Slot 104 contains the address of B::X( ), ie. the address of int X( ) of class B, and slot 108 contains the adjustment to the this pointer to the address of the occurrence of the introducing class in the object of function B::X( ). In this example, the adjustment to the this pointer is zero. For purposes of illustration, slots 104 and 108 each consist of a portion of memory four bytes in length, and as such, VFT 100 has a size of eight bytes. It will be apparent to those skilled in the art that the present invention is not limited to four byte representations of addresses, and can be employed with larger or smaller representations.

A VFT 120 for class C has two slots 124 and 128. Slot 124 contains the address of C::Y( ), and slot 128 contains the adjustment to the this pointer which is zero in this case. VFT 120 is eight bytes long.

Derived class D has two VFT's. Conventionally, a first VFT 140 contains entries for virtual functions inherited or introduced along the left leg 24 of the inheritance tree 20, ie. a composite VFT for the virtual functions from classes B and D. VFT 140 contains slots 144, 148, 152 and 156. Slot 144 contains the address of D::X( ), slot 148 contains the zero adjustment to the this pointer, slot 152 contains the address of function D::Z( ), and slot 156 contains the zero adjustment to the this pointer for function D:Z( ). In this example, the adjustments contained within slots 148 and 156 are zero since the adjustment to this pointers along the left leg 24 is always zero.

A second VFT 160 contains slots 164 and 168 for class C within class D. Slot 164 is the address of function D::Y( ) and slot 168 is the adjustment to the this pointer, in this case minus eight bytes. Generally, the adjustment is added to the address of the introducing class to obtain the address of the overriding class.

VFT 140 has a length of sixteen bytes and VFT 160 has a length of eight bytes, resulting in a total combined length of twenty-four bytes for VFT's 140 and 160 associated with class D. The total size of VFT's 100, 120, 140 and 160 for the hierarchy of classes B, C and D is forty bytes.

Figure 2A:
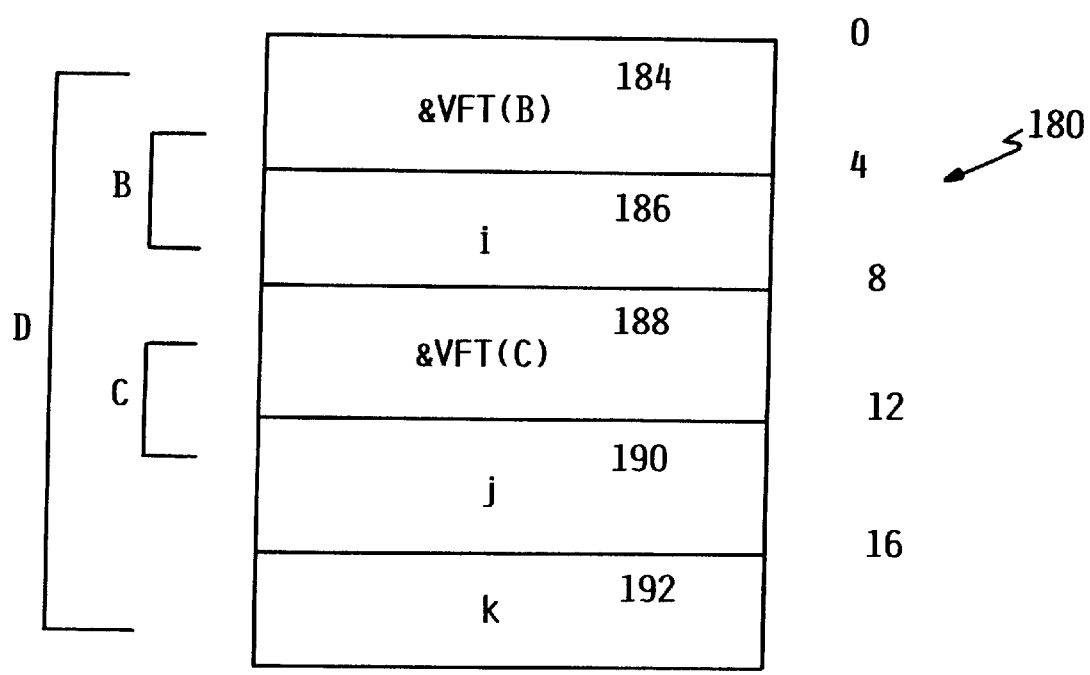
FIG. 2a shows an object which is an instance of a class in accordance with the prior art.

FIG. 2a illustrates a typical object 180 which is an instance of class D. Such an object typically contains two pointers to VFT's. A first slot 184 is located at offset "0" within object 180, and corresponds to the beginning of base class B. Slot 184 contains a pointer to the VFT for class B within D. A second slot 186 is located at offset "4" of object 180 and contains data member i of class B. Similarly, a pointer to the VFT for class C within D is located in a slot 188 at offset "8" within object 180, and data member j of class C is contained in a slot 180 at offset "12". A slot 192, located at offset "16" of object 180, contains data member k of class D.

Figure 3:
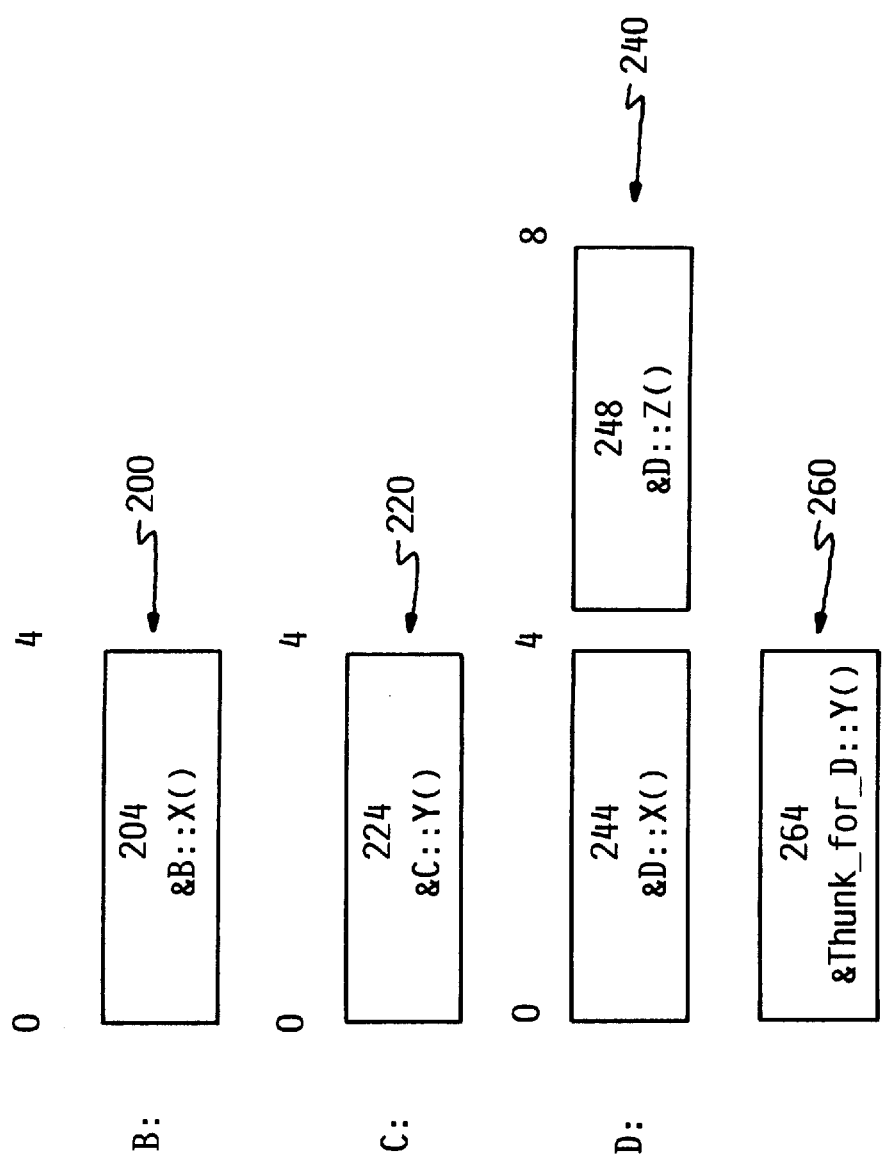
FIG. 3 shows a further set of VFT's constructed in accordance with the prior art.

If the classes in the hierarchy found in Code Segment 1 are all new classes, the VFT's produced by a known adjustor thunk implementation are as shown in FIG. 3. Only one slot is required for each virtual function, as opposed to the two slots per virtual function as discussed above.

A VFT 200 for class B has a slot 204 containing the address of function B::X( ). Similarly, a VFT 220 for class C has a slot 224 containing the address of function C::Y( ). VFT's 200 and 220 are each four bytes long.

Class D has two VFT's 240 and 260. VFT 240, for the functions introduced in the left leg 24 of the inheritance tree 20 which are defined to always have a zero adjustment to the this pointer, has slots 244 and 248 containing the addresses of functions D::X( ) and D::Z( ), respectively. VFT 260 has one slot 264 containing the address of an adjustor thunk for D::Y( ) since calling function Y( ) requires a minus eight adjustment to the this pointer, as mentioned above. Code for a typical adjustor thunk is shown in Code Segment 2. The adjustor thunk adjusts the value of the this pointer of the object for which function D::Y( ) is called, and then jumps to function D::Y( ). The total combined size of the VFT's 240 and 260 is twelve bytes, and the total size of VFT's 200, 220, 240 and 260 for the hierarchy of classes B, C and D is reduced to twenty bytes from the previous example.

The present invention will now be described in relation to the preceding discussion of the prior art VFT implementations. Generally, when compiler developers previously desired to retain backwards compatibility with classes compiled with an old compiler, the VFT's for a class hierarchy were constructed employing the old VFT structure, and could not take advantage of the more efficient adjustor thunk method without recompiling all the code. The present invention provides hybrid VFT's which can take advantage of the smaller, more efficient adjustor thunk implementation for newly introduced functions, while still retaining backwards compatibility, without recompilation, for functions compiled with old compilers.

Figure 4:
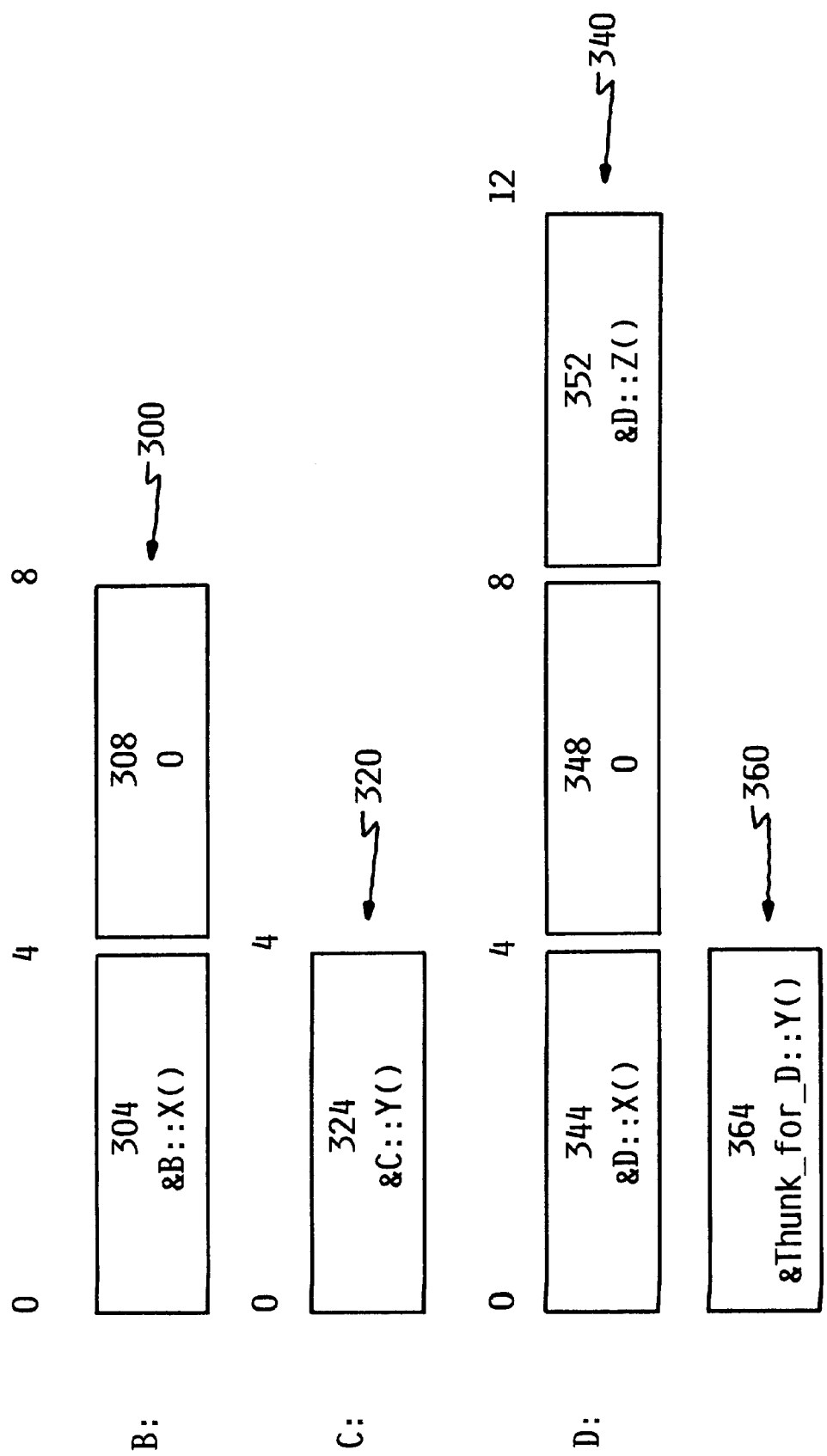
FIG. 4 shows a set of VFT's constructed in accordance with the present invention.

Referring, for example, to FIG. 1, if class B is an old class, ie. compiled by an old compiler, and classes C and D are newly compiled classes, the present invention provides VFT's having the entries shown in FIG. 4. As in the above discussion of old VFT structures, a VFT 300 for class B has two slots 304 and 308, each 4 bytes in length, containing the address of B::X( ) and the adjustment to the this pointer associated with the object of B::X( ), respectively. By contrast, a VFT 320 for class C, a newly compiled base class which introduces virtual function Y( ), uses the adjustor thunk implementation and has one slot 324 containing the address of C::Y( ), as in the previous discussion of new VFT structures.

Newly compiled Class D inherits virtual function X( ) from old class B, virtual function Y( ) from class C and introduces virtual function Z( ). Class D has a VFT 340 associated with the virtual functions introduced along the left leg 24 of the inheritance tree 20, ie. functions X( ) and Z( ), and a VFT 360 for the function(s) introduced in remaining class C. VFT 340 consists of three slots 344, 348 and 352, each four bytes in length. Since function X( ) was first introduced in an old class, its associated entry in VFT 340 requires two slots 344 and 348, where slot 344 contains the address of D::X( ) and slot 348 contains the adjustment to the this pointer, which is zero in this case. Because function Z( ) is introduced in a newly compiled class and requires no adjustment to the this pointer to be invoked, its entry in VFT 340 requires only one slot 352 containing the address of D::Z( ). VFT 340 is 12 bytes in length.

VFT 360 consists of one four byte slot 364 for an entry associated with virtual function D::Y( ). The entry in slot 364 is the address of a thunk for D::Y( ) which adjusts the this pointer by minus eight before jumping to function Y( ), as discussed above.

The combined size of VFT's 340 and 360 for class D is sixteen bytes, and the total length of VFT's 300, 320, 340 and 360 for the hierarchy of classes B, C and D is twenty-eight bytes. As will be apparent to those of skill in the art, the hybrid VFT implementation requires twelve fewer bytes than the corresponding prior art implementation where all classes are compiled using the old VFT structure.

The total length of VFT's constructed by the hybrid VFT method depends on the number of old classes in a hierarchy. If old classes are present in the hierarchy, the total length is greater than that under the adjustor thunk implementation. However, the slight increase in size over the adjustor thunk method is offset by the cost, time and effort which would be incurred if the old classes have to be recompiled and retested.

The hybrid VFT implementation allows classes compiled by an old compiler to be integrated with newly compiled classes without recompilation of the old classes, while still allowing the newly introduced functions to be invoked with the more efficient adjustor thunk method. This is possible because the old classes are not aware of the new classes which follow them in the hierarchy tree 20. By definition, old classes only inherit from old classes, and only have access to virtual functions which have been inherited or introduced by the class itself. Therefore, there is no need for old classes to have an ability to call functions by an adjustor thunk method. As will be more fully discussed below, newly compiled classes can determine the appropriate method for calling a function, depending on the compiler used to compile the introducing class of the function. Thus, code compiled using the hybrid VFT implementation remains backwardly compatible, but can still take advantage of faster and more efficient function calls for newly compiled functions.

Figure 5:
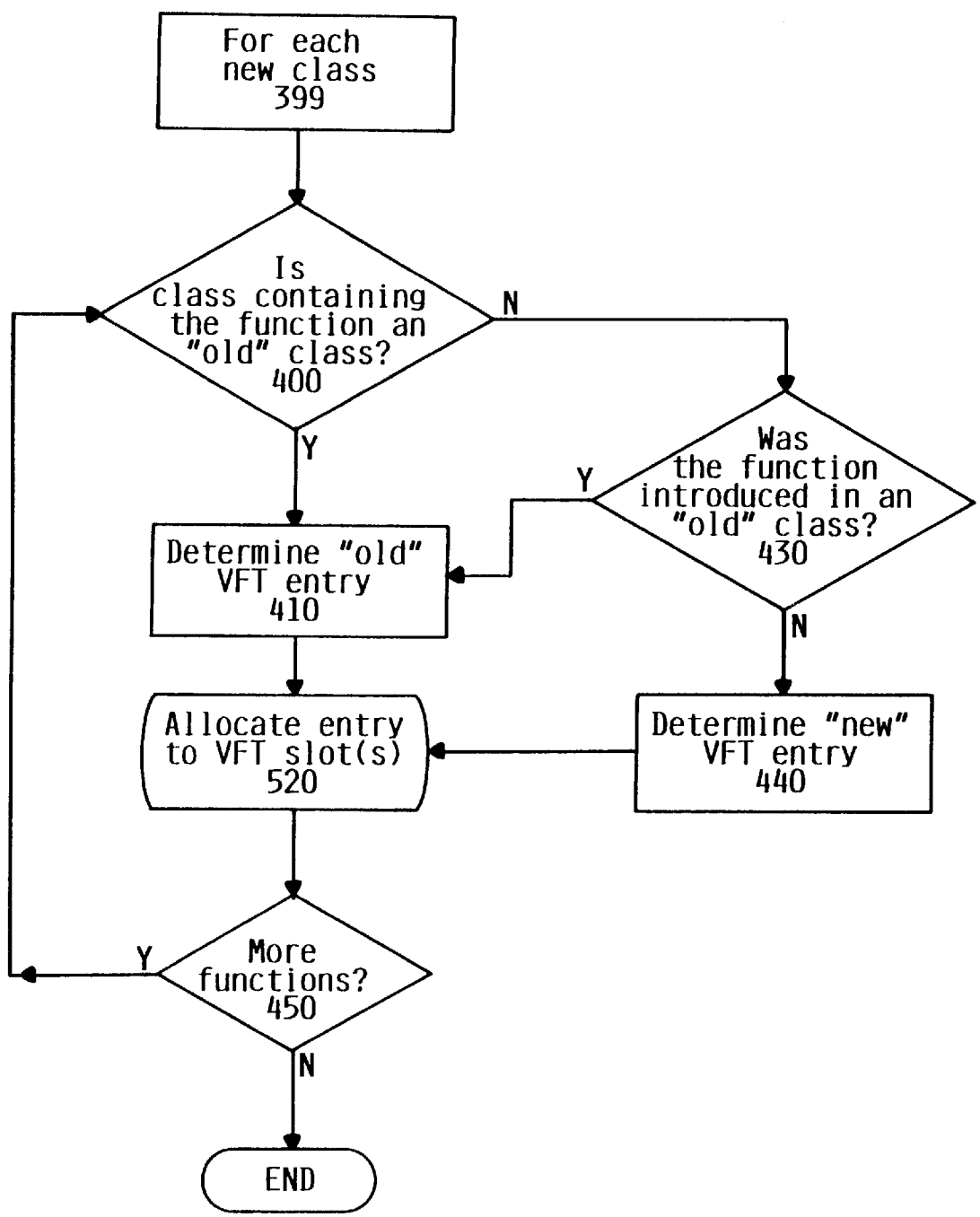
FIG. 5 shows a flow chart of a method for determining the number and content of slots in a hybrid VFT.

FIG. 5 shows a flow chart of a method for constructing a hybrid VFT for a class, in accordance with the present invention. For each function inherited or introduced by a class at step 399, the compiler used to compile the class, or the format of the entry for the function is first determined at step 400. A pragma, flag, command line option, or other suitable method, as is known to those of skill in the art, can be used as the basis upon which the determination is made. If the class is determined to be an old class, ie. a class compiled by an old compiler, a VFT entry for the function is determined at step 410, consisting of the address of the function and the this pointer adjustment, respectively. The entry is then allocated to two slots in the VFT at step 420.

If the class is not determined as old at step 400, it is necessary to determine at step 430, by a pragma or other appropriate method, whether the compiler used to compile the class which introduced the function was old. If the function was introduced by an old class the VFT entry for the function is created at step 410, above. If the function was introduced by a class compiled by a compiler using the adjustor thunk implementation, the address of the function, or the address of a thunk for the function, as appropriate, is determined at step 430 and allocated to a slot in the VFT at step 420.

The method is then repeated, at step 450, until VFT entries have been created for each function in the class. A hybrid VFT, like prior art VFT's, can be constructed when a class is compiled, when a function call is compiled, or at run-time. As will be appreciated by those of skill in the art, once a class has been compiled, the compiler knows the form of the VFT for the class, such as offsets and the size of the slots that will be required for each entry, even if the VFT is not immediately constructed.

The determination of a function as "new" or "old" during compilation will determine the method by which the function is called at run-time. As is known to those of skill in the art, if the function is old, ie. its VFT entry consists of a pointer and a this adjustment, the caller first uses the this pointer to find the VFT for the object of the function. The caller then indexes into the VFT at the slot corresponding to the function to be called. The caller then loads the this adjustment that is to be applied to the this pointer to get the this expected by the function to be called. The caller then loads the pointer to the function to be called and uses it to call the function.

If the function is new, ie. its VFT entry consists of a pointer to the function or a pointer to a thunk, the caller uses the this pointer to find the VFT for the object. The caller then indexes into the VFT to the slot corresponding to the function to be called. The caller then loads the pointer to the function to be called contained in the slot and uses it to call the function. If an adjustment to the this pointer is required, then instead of directly invoking the function, the pointer loaded from the virtual function table will be a pointer to a thunk instead of a pointer to the function. The thunk will adjust the this pointer and then jump to the function to be called.

Figure 6A:
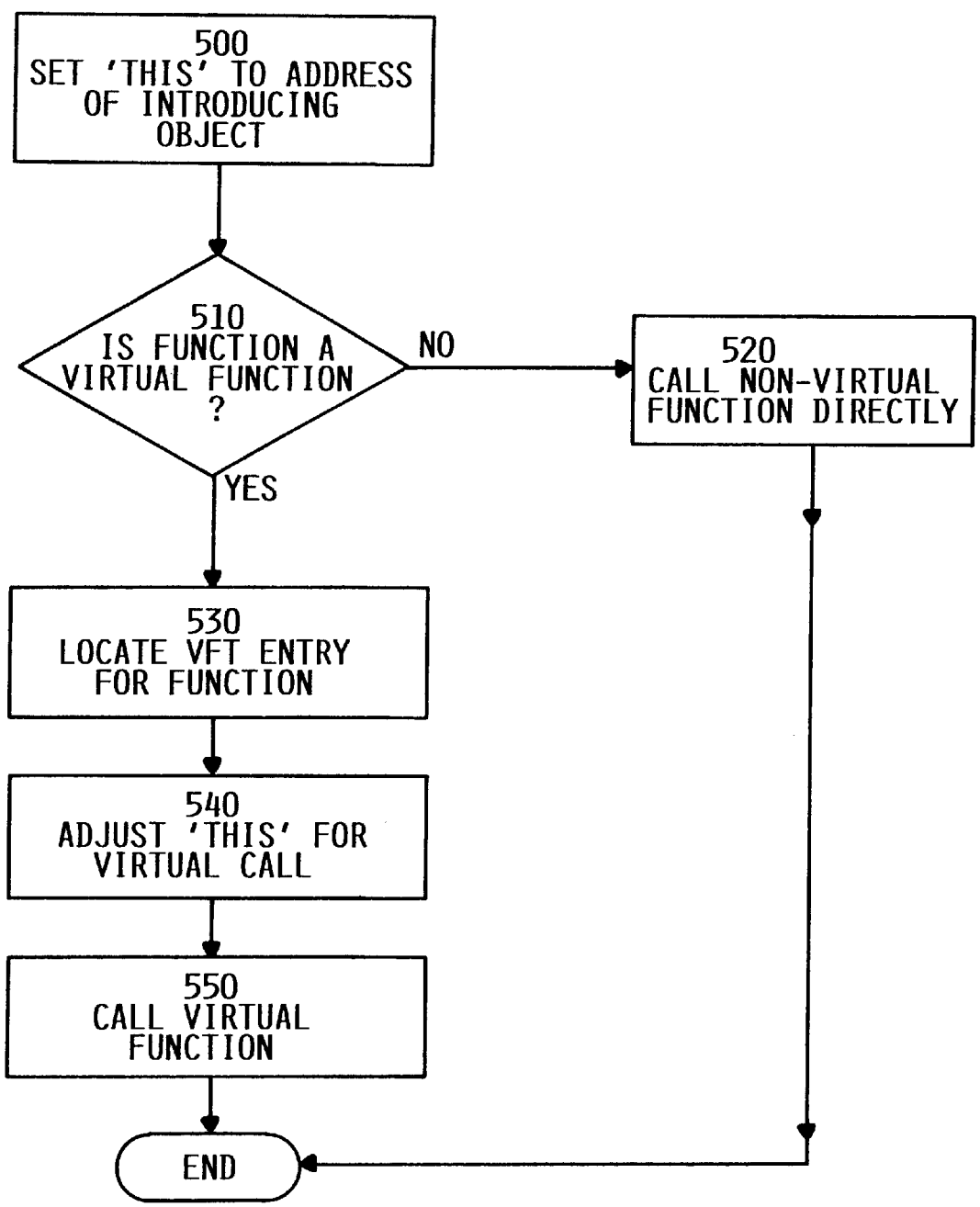
FIG. 6a shows a flow chart of a method for invoking an old virtual function.

FIG. 6a illustrates the calling of a virtual function which the compiler knows to be old. At step 500 the this pointer is set to the address of the introducing object. At step 510 a flag, pragma, or other suitable indicator, indicates whether the function is virtual. If the function is not virtual, the function is called directly at step 520. If the function is virtual, the VFT entry for the function is found in its associated VFT at step 530. An appropriate adjustment, either zero or non-zero, is made to the this pointer at step 540, and the virtual function is then called at step 550. An example of code which can be used to implement this method is found in Code Segment 3a.

Figure 6B:
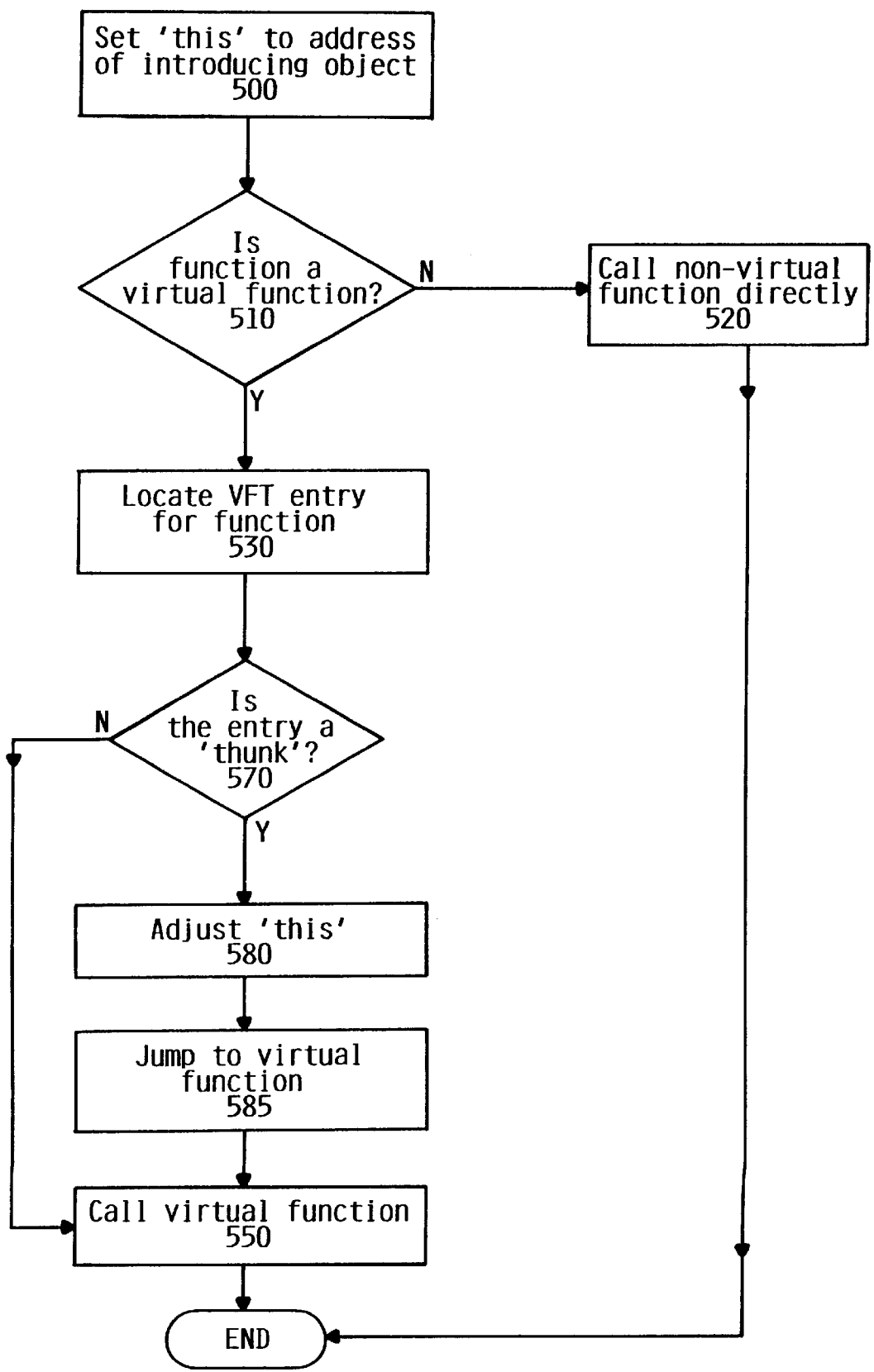
FIG. 6b shows a flow chart of a method for invoking a new virtual function.

FIG. 6b illustrates a method for calling a function which the compiler knows to be new. At step 500 the this pointer is set to the address of the introducing object. At step 510 a flag, pragma, or other suitable indicator, indicates whether the function is virtual. If the function is not virtual, the function is called directly at step 520. If the function is virtual, the VFT entry for the function is found in its associated VFT at step 530 and loaded by the caller at step 560. If pointer loaded at step 560 does not point to a thunk then the function will be located at the location indicated by the pointer, and the function will be invoked at step 550. If the pointer does point to a thunk at step 570, the thunk adjusts the value of the this pointer at step 580, and then jumps to the location of the function at step 585 where it will be invoked at step 550. An example of code which can be used to implement this method is found in Code Segment 3b.

As is known to those of skill in the art, C++ a pointer to function member ("PTFM") can also be used in a call to a function. A PTFM must be capable of representing all the information to invoke any non-static member function in, or inherited by, a class, provided the function has the same signature and return type as declared for the PTFM. As with VFT's, the information in a PTFM is generally inherited by a PTFM for a derived class with appropriate translation of its internal data to, for example, convert the PTFM for class B, B::*, to the PTFM for class D, D::*.

As is known for a compiler employing the old VFT layout, a PTFM includes information sufficient to locate the introducing object of a function, to identify the function as virtual, and, if the function is virtual, to locate the appropriate address slot in a VFT.

As with VFT's, the information in a PTFM is generally inherited by a PTFM for a derived class with appropriate translation of its internal data to, for example, convert B::* to D::*. As is apparent, a PTFM inherited from a class not compiled with the hybrid VFT implementation of the present invention will not contain the additional flag indicating whether the VFT is old or new. Therefore, when converting a PTFM it is necessary to add this flag to the PTFM and initialize it appropriately.

Figure 7:
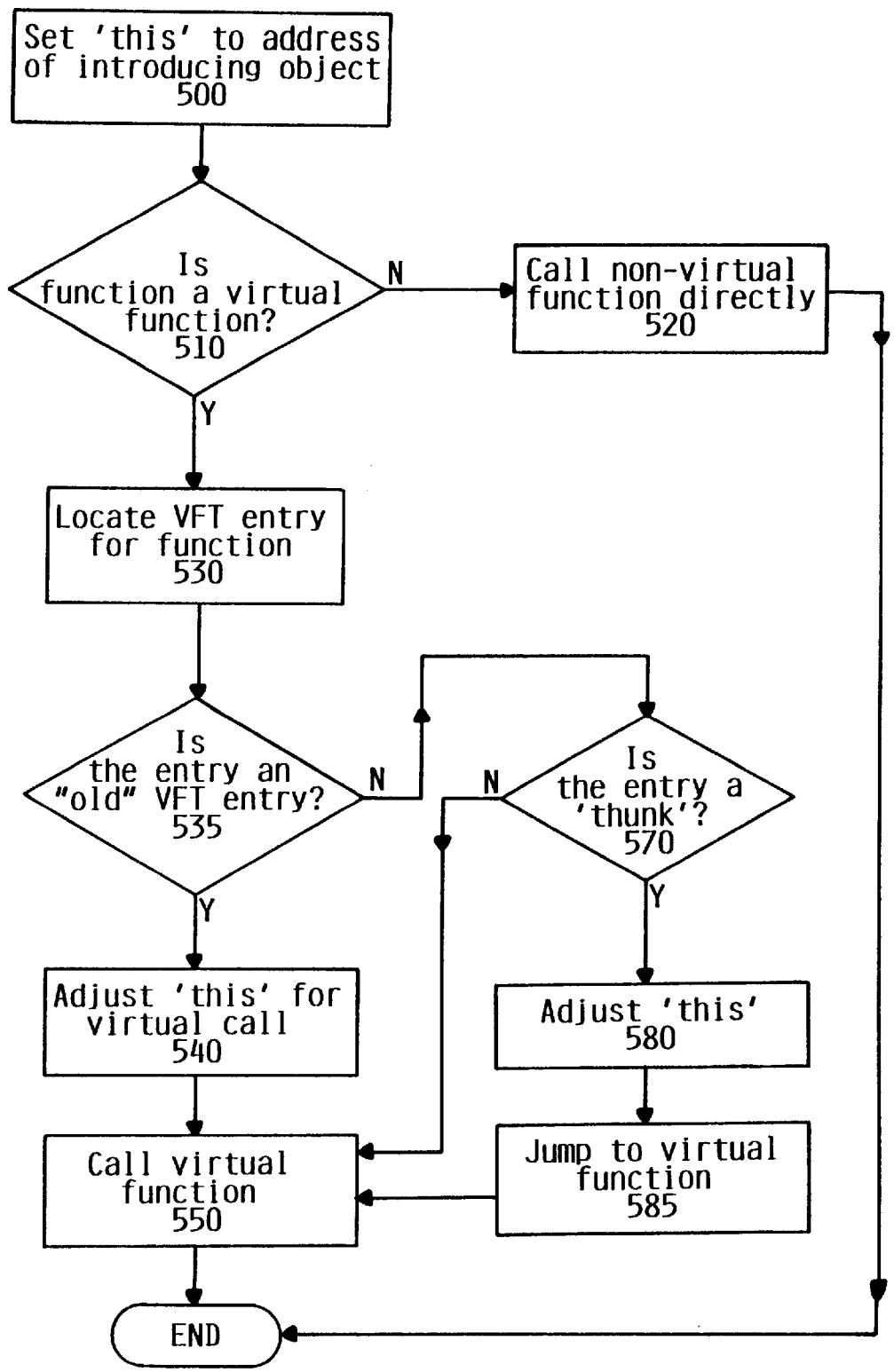
FIG. 7 shows a method for invoking a hybrid virtual function using a PTFM.

To invoke a function using a hybrid VFT layout in accordance with an embodiment of the present invention. The PTFM includes a flag, such as a bit code boolean indicator to indicate whether the function is old or new. A method for calling a function using a PTFM with an added flag is illustrated in the flow chart of FIG. 7. The method is the same as described in relation to FIG. 6a or 6b until the VFT entry is located at step 530. At step 535 the additional flag indicates whether the VFT entry is an old or new entry. If the entry is old, the method proceeds as before through steps 540 and 550. If the entry is new, the call proceeds with steps 560, 570, 580, and/or 585, as described above in relation to FIG. 6b. An example of code to implement such a routine is shown in Code Segment 4 where the additional flag contained in the PTFM is "isNew".

To those skilled in the art it will be apparent that the present invention overcomes many of the disadvantages of the prior art. By providing a hybrid VFT structure, the present invention preserves backwards compatibility with previously compiled classes which require a VFT containing a function address and this pointer adjustment for each function. Meanwhile newly introduced functions and classes can be compiled using the more efficient adjustor thunk implementation. The VFT's for newly defined classes can also contain entries for functions inherited from an old class, without necessitating recompilation of the old code. The resulting hybrid VFT's require less memory than those constructed by old compilers, and provide a faster and more efficient means to call virtual functions.

It will be apparent to those skilled in the art that the foregoing is by way of example only. Modifications, variations and alterations may be made to the described embodiments without departing from the scope of the invention which is defined solely in the claims.

Code Segment 1:

```
class B {
        public:
                virtual int X( );
                int i;
        };
class C {
        public:
                virtual int Y( ):
                int j;
};
class D : public B, public C {
        public:
                virtual int X( );
                virtual int Y( );
                virtual int Z( );
                int k;
};
```

Code Segment 2:

```
Thunk_for_D::Y( )
        this<-this - 8
        jmp D::Y( )
```

Code Segment 3a:

```
struct VFT_OLD {
        FUNCPTR fcn;
        int adj;
};
this->vft[slot].fcn(this + this ->vft[slot].adj);
```

Code Segment 3b:

```
struct VFT_NEW {
        FUNCPTR fcn;
};
this->vft[slot].fcn(this);
```

Code Segment 4:

```
struct VFT_OLD {
        FUNCPTR fcn;
        int adj;
};
struct VFT_NEW {
        FUNCPTR fcn;
};
union VFT {
        struct VFT_OLD old[1];
        struct VFT_NEW new[1];
};
if(isNew)
        this->vft.new[PTFM.slot].fcn( this );
else
        this->vft.old[PTFM.slot].fcn(
                this + this->vft.old[PTFM.slot].adj );
```

We claim:

1. A computer implemented method of compiling at least a portion of a computer program for calling at least one inherited virtual function in at least one class, the method comprising the steps of:

determining the inherited virtual functions in said at least one class for which an address adjustment value would be stored in a virtual function table; and constructing said virtual function table for said at least one class, said virtual function table comprising an entry for each inherited virtual function and for any new virtual function introduced in said at least one class, said virtual function table comprising entries of at least two different types, wherein each entry of a first type in said virtual function table for each said determined inherited virtual function includes a first field containing an address pointer of a virtual function and a second field containing an address adjustment value by which to adjust said address of a virtual function contained in said first field, and wherein each entry of a second type in said virtual function table for each remaining inherited virtual function and for each new virtual function comprises a first field containing an address pointer and does not include a field containing an address adjustment value, each said address pointer in a first field of an entry of said second type representing one of the location of an address adjustment program and an address of said function.

2. The method according to claim 1, wherein each said entry is initialized data in a portion of a computer program.

3. The method according to claim 1, wherein said step of determining includes determining if said at least one class is specified to contain functions for which an address adjustment value would be stored in a virtual function table.

4. The method according to claim 3, wherein said step of determining employs a pragma.

5. The method according to claim 1, wherein, in constructing said virtual function table, two slots are reserved for each said determined virtual function, and wherein one slot is reserved for each remaining inherited virtual function and for each new virtual function.

6. The method according to claim 1, wherein said address adjustment program is a thunk.

7. The method according to claim 1, wherein said address adjustment value is for adjusting a value of a this pointer.

8. The computer-implemented method for compiling a call to a virtual function in at least one class, the method comprising the steps of:

determining inherited virtual functions in said at least one class for which an address adjustment value would be stored in a virtual function table;

determining a location of an entry for said virtual function in a virtual function table, said virtual function table comprising an entry for each inherited virtual function and for any new virtual function introduced in said at least one class, wherein said virtual function table comprises entries of at least two different types, wherein each entry of a first type for each said determined inherited virtual function includes a first field containing an address pointer to said inherited virtual function and a second field containing an address adjustment value by which to adjust said address pointer in said first field, and wherein each entry of a second type for each remaining inherited virtual function and for each new function comprises a first field containing an address pointer and does not include a field containing an address adjustment value, each said address pointer in a first field of an entry of said second type representing one of the location of an address adjustment program and an address of said function; and employing said entry to operably construct a call to said virtual function.

9. The method according to claim 8, wherein a pointer to function member is associated with said function, said pointer to function member including an indicator for indicating said function has an address adjustment value stored therefor.

10. The method according to claim 8, wherein each said entry is initialized data in a portion of a computer program.

11. The method according to claim 8, wherein said step of determining includes determining if said at least one class is specified to contain functions for which an address adjustment value would be stored in a virtual function table.

12. The method according to claim 11, wherein said step of determining employs a pragma.

13. The method according to claim 8, wherein each entry for each said determined virtual fiction uses two slots.

14. The method according to claim 8, wherein each entry for each remaining inherited virtual function and for each new virtual function uses one slot.

15. The method according to claim 8, wherein said address adjustment program is a thunk.

16. The method according to claim 8, wherein said address adjustment value is for adjusting a value of a this pointer.

17. The computer-implemented method for accessing a virtual function in at least one class of a program, comprising the steps of:

accessing an entry associated with said virtual function in a virtual function table constructed for said at least one class, said virtual function table comprising an entry for each inherited virtual function and for any new virtual function introduced in said at least one class, wherein said virtual function table comprises entries of at least two different types, wherein each entry of a first type for an inherited virtual function for which an address adjustment is required includes a first field containing an address pointer to said inherited virtual function and a second field containing an address adjustment value by which to adjust said address pointer in said first field, and wherein each entry of a second type for each remaining inherited virtual function and for each new function comprises a first field containing an address pointer and does not include a field containing an address adjustment value, each said address pointer in a first field of an entry of said second type representing one of the location of an address adjustment program and an address of said function;

performing an address adjustment using said address adjustment value when an entry for said virtual function is of said first type; and transferring execution of the program to the address indicated by the address pointer contained in said entry.

18. The method according to claim 17, wherein a pointer to function member is associated with said called function, said pointer to function member including an indicator for indicating said called function has an address adjustment value stored therefor.

19. The method according to claim 17, wherein said address adjustment value is an address adjustment for a this pointer.

20. The method according to claim 17, wherein said address adjustment value is contained in a separate slot from said address pointer.

21. The method according to claim 17, wherein said address pointer points to a thunk.

22. A computer program product for compiling object-oriented programming code, said object-oriented programming code calling at least one inherited virtual function in at least one class, said computer program product having a plurality of instructions embodied in a computer readable medium, wherein said instructions, when executed by a computer, perform the steps of:

determining the inherited virtual functions in said at least one class for which an address adjustment value would be stored in a virtual function table; and constructing said virtual function table for said at least one class, said virtual function table comprising an entry for each inherited virtual function and for any new virtual function introduced in said at least one class, said virtual function table comprising entries of at least two different types, wherein each entry of a first type in said virtual function table for each said determined inherited virtual function includes a first field containing an address pointer of a virtual function and a second field containing an address adjustment value by which to adjust said address of a virtual function contained in said first field, and wherein each entry of a second type in said virtual function table for each remaining inherited virtual function and for each new virtual function comprises a first field containing an address pointer and does not include a field containing an address adjustment value, each said address pointer in a first field of an entry of said second type representing one of the location of an address adjustment program and an address of said function.

23. The computer program product according to claim 22, wherein each said entry is initialized data in a portion of a computer program.

24. The computer program product according to claim 22, wherein said step of determining includes determining if said at least one class is specified to contain functions for which an address adjustment value would be stored in a virtual function table.

25. The computer program product according to claim 24, wherein said step of determining employs a pragma.

26. The computer program product according to claim 22, wherein, in constructing said virtual function table, two slots are reserved for each said determined virtual function, and wherein one slot is reserved for each remaining inherited virtual function and each new virtual function.

27. The computer program product according to claim 22, wherein said address adjustment program is a thunk.

28. The computer program product according to claim 22, wherein said address adjustment value is for adjusting a value of a this pointer.

* * * * *